(12) United States Patent
Roberge et al.

(10) Patent No.: US 8,139,230 B2
(45) Date of Patent: Mar. 20, 2012

(54) ACQUISITION OF TOPOGRAPHIES OF OBJECTS HAVING ARBITRARY GEOMETRIES

(75) Inventors: Danny Roberge, St-Bruno-de-Montarville (CA); Alain Beauchamp, Montréal (CA)

(73) Assignee: Forensic Technologies Wai Inc., Montreal (CA)

( * ) Notice: Subject to any disclaimer, the term of this patent is extended or adjusted under 35 U.S.C. 154(b) by 348 days.

(21) Appl. No.: 12/466,847

(22) Filed: May 15, 2009

(65) Prior Publication Data
US 2009/0284756 A1 Nov. 19, 2009

Related U.S. Application Data

(60) Provisional application No. 61/053,874, filed on May 16, 2008.

(51) Int. Cl.
*G01B 11/30* (2006.01)
*G01B 11/26* (2006.01)
*G01B 11/14* (2006.01)
*G01C 1/00* (2006.01)
*G06K 9/00* (2006.01)

(52) U.S. Cl. ......... 356/601; 356/138; 356/614; 382/154
(58) Field of Classification Search .................... None
See application file for complete search history.

(56) References Cited

U.S. PATENT DOCUMENTS

| | | | |
|---|---|---|---|
| 3,800,074 A | 3/1974 | Fletcher et al. | |
| 4,339,745 A | 7/1982 | Barber et al. | |
| 5,390,108 A | 2/1995 | Baldur et al. | |
| 5,548,396 A * | 8/1996 | Morita et al. | 356/127 |
| 5,760,906 A * | 6/1998 | Sato | 356/602 |
| 5,841,894 A | 11/1998 | Horie | |
| 5,844,670 A * | 12/1998 | Morita et al. | 356/124 |
| 5,960,379 A * | 9/1999 | Shimizu et al. | 702/155 |
| 6,496,253 B1 * | 12/2002 | Vokhmin | 356/124 |
| 6,505,140 B1 | 1/2003 | Bachrach | |

(Continued)

FOREIGN PATENT DOCUMENTS
CA 2207454 8/2000
(Continued)

OTHER PUBLICATIONS

International Search Report dated Aug. 5, 2009 issued from the International Patent Application No. PCT/CA2009/000677.

*Primary Examiner* — Tarifur Chowdhury
*Assistant Examiner* — Gordon Stock, Jr.
(74) *Attorney, Agent, or Firm* — Norton Rose Canada LLP

(57) ABSTRACT

There is described a method for positioning an object on an optical sensor system for acquiring a surface thereof, the sensor system having a set of motors for rotating the object around a motor axis perpendicular to an optical axis of the sensor system and for translating the object in X, Y and Z directions, the method comprising: (a) acquiring a relief map of an area in a field of view of the sensor system; (b) computing a normal representative of a topography of the relief map of the area; (c) determining an angle difference between the normal and the optical axis of the sensor system; (d) comparing the angle difference to a threshold angle to determine if the surface of the area is perpendicular to the sensor axis; (e) if the angle difference is greater than a threshold angle, rotating the object to obtain a new difference angle less than the threshold angle; and (f) translating the object to reposition the area in the field of view after the rotating has displaced the area.

25 Claims, 10 Drawing Sheets

U.S. PATENT DOCUMENTS

| | | | |
|---|---|---|---|
| 6,651,029 B2 * | 11/2003 | Sakai | 702/167 |
| 7,164,955 B2 * | 1/2007 | Moreas et al. | 700/59 |
| 2005/0151978 A1 * | 7/2005 | Nakamura et al. | 356/602 |
| 2010/0217561 A1 * | 8/2010 | Mills | 702/168 |

FOREIGN PATENT DOCUMENTS

| | | | |
|---|---|---|---|
| JP | 2004045231 A | * | 2/2004 |
| RU | 2084820 C1 | * | 7/1997 |
| RU | 2130628 C1 | * | 5/1999 |

* cited by examiner

ACQUISITION OF TOPOGRAPHIES OF OBJECTS HAVING ARBITRARY GEOMETRIES

CROSS-REFERENCE TO RELATED APPLICATIONS

The present application claims priority under 35 USC §119(e) of Provisional Patent Application bearing Ser. No. 61/053,874, filed on May 16, 2008, the contents of which are hereby incorporated by reference.

TECHNICAL FIELD

The present invention relates to the field of the analysis and comparison of objects having tool marks thereon, and particularly to the analysis of objects that are deformed and/or of unconventional shape.

BACKGROUND

In the field of forensic science, investigations of crimes involving firearms use ballistic comparison tests to determine if a bullet or a spent cartridge case found on the crime scene has been fired by a firearm in question. Ballistic comparison tests rely on the striations and/or impressions that are created on the surface of a piece of evidence when a firearm is fired. These striations and/or impressions have enough unique features to represent a signature of the firearm. Therefore by comparing the striations or impressed characteristics of two bullets or two cartridge cases, it is possible to conclude if they have been fired by the same firearm. Similarly, by comparing the striations and/or impressions on two objects showing tool marks resulting from cutting, prying, hammering or any other action performed with a tool, it is possible to conclude that the aforementioned action was performed with the same tool.

Most existing automatic ballistic and/or tool mark comparison systems acquire 2D luminance images $L(X,Y)$. Other systems acquire 3D topography images as well, that is, a relief map $Z(X,Y)$ of an area on a ballistic piece of evidence, where Z is the local height of the surface at position $(X,Y)$ relative to the sensor used. In most cases, the area of the ballistic piece of evidence or the tool mark piece of evidence needed for analysis purposes is larger than the field of view of the sensor used to measure the aforementioned surface characteristics. Since the area is larger than the field of view of the sensor, several 3D and 2D images are successively acquired and motion is applied to the surface to be measured between each image acquisition. The 3D images are then merged into a unique, larger image (and similarly for the 2D images).

When acquiring each individual 3D and 2D image of an object showing tool mark patterns, the surface within the field of view must be as perpendicular to the optical axis of the sensor as possible. The information relevant for surface analysis is the shape, length and depth of the mark. If the surface is not locally perpendicular to the optical axis, occlusion may occur, and the bottom of the mark, which is used to define the depth, cannot be imaged properly. Furthermore, since many of the surfaces on which tool marks are efficiently transferred are metallic in nature, and considering that the reflection of the light from a metallic surface has a strong specular contribution, most of the light reflected back to the sensor is from regions nearly perpendicular to the optical axis. For that reason, several 3D sensor technologies, including confocal ones, have a hard time finding the 3D topography of metallic surfaces which are not reasonably perpendicular to the optical axis.

When acquiring the 3D topography of an object with a perfectly cylindrical cross section, such as a pristine fired bullet, it is sufficient to rotate the object during data acquisition if the bullet is installed with its symmetry axis perfectly aligned along the rotation axis of the motor system and the starting area to be acquired is set perpendicular to the optical axis of the sensor. Simple rotation of the bullet will then ensure that the surface within the field of view of the sensor is always perpendicular to the sensor's axis. In the case of a flat surface, no rotation is necessary. The flat surface is installed with its starting area perpendicular to the sensor axis. Translational motions are then sufficient to insure that all other acquired areas also remain perpendicular to the axis.

The situation is significantly different for deformed bullets or arbitrary surfaces showing tool marks, which can display a large variety of shapes: elliptical, flat, locally concave, among others. The techniques known in the prior art cannot be applied to these arbitrary shapes as they will not ensure proper capture of the local micro topography.

SUMMARY

In accordance with a broad aspect of the present invention, there is provided a method for positioning an object on an optical sensor system for acquiring a surface thereof, the sensor system having a set of motors for rotating the object around a motor axis perpendicular to an optical axis of the sensor system and for translating the object in X, Y and Z directions, the method comprising: (a) acquiring a relief map of an area in a field of view of the sensor system; (b) computing a normal representative of a topography of the relief map of the area; (c) determining an angle difference between the normal and the optical axis of the sensor system; (d) comparing the angle difference to a threshold angle to determine if the surface of the area is perpendicular to the sensor axis; (e) if the angle difference is greater than a threshold angle, rotating the object to obtain a new difference angle less than the threshold angle; and (f) translating the object to reposition the area in the field of view after the rotating has displaced the area.

In accordance with another broad aspect of the present invention, there is provided a object positioning system for use with an optical sensor system for acquiring a surface of the object, the sensor system having a set of motors for rotating the object around a motor axis perpendicular to an optical axis of the sensor system and for translating the object in X, Y and Z directions, the system comprising: a processor in a computer system; a memory accessible by the processor; and an application coupled to the processor, the application configured for: (a) acquiring a relief map of an area in a field of view of the sensor system; (b) computing a normal representative of a topography of the relief map of the area; (c) determining an angle difference between the normal and the optical axis of the sensor system; (d) comparing the angle difference to a threshold angle to determine if the surface of the area is perpendicular to the sensor axis; (e) if the angle difference is greater than a threshold angle, rotating the object to obtain a new difference angle less than the threshold angle; and (f) translating the object to reposition the area in the field of view after the rotating has displaced the area.

It should be understood that while the present description uses bullets and casings to illustrate the invention, the concepts described herein can be extended to any objects that are neither round, or cylindrical or flat and need to be repositioned using rotation and/or translation in order to obtain a surface that is substantially perpendicular to an optical axis of a sensor system. In addition, the expression "optical sensor"

should be understood as meaning any sensor that uses electromagnetic rays reflected off or emitted from a surface as a source of information for acquiring an image. Furthermore, while the present description refers to a rotation motor axis approximately parallel to the symmetry axis of the bullet (for the non deformed case) and perpendicular to the vertical direction, the concepts described herein can be extended to a second motorized axis perpendicular to both the previous axis and the vertical direction.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
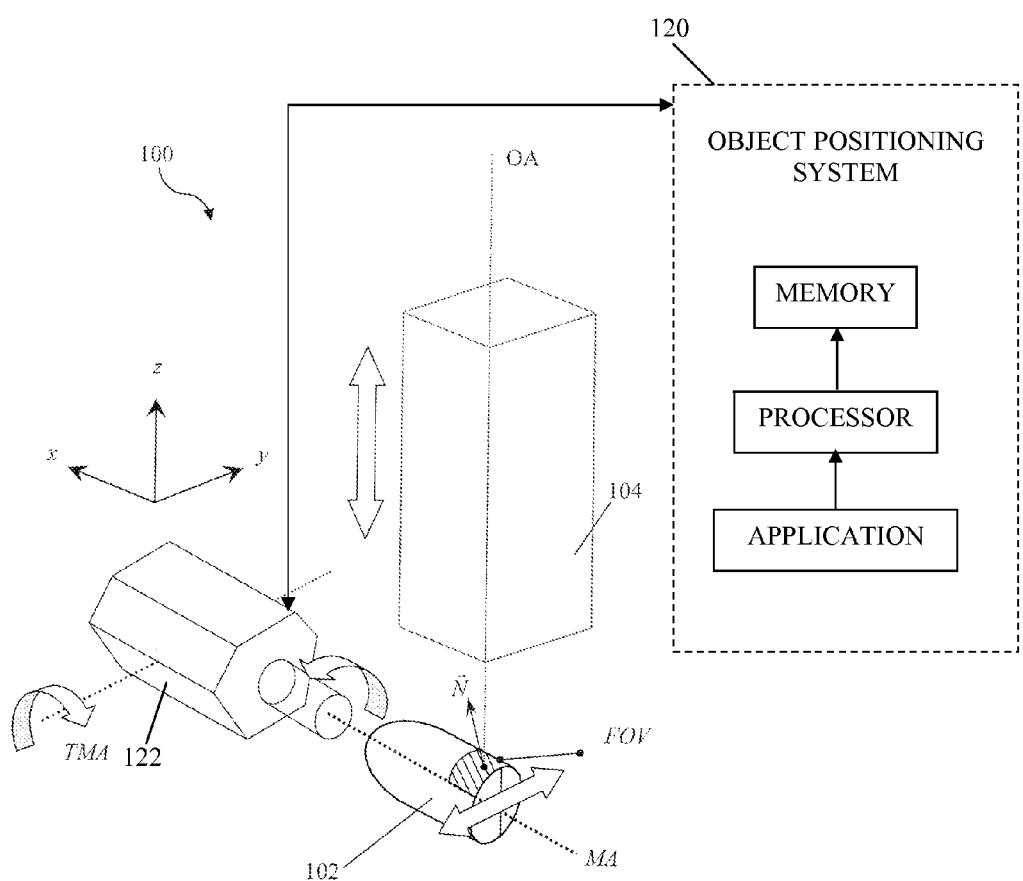
FIG. 1 illustrates a sensor system used for to acquire surfaces of objects of arbitrary geometries, in accordance with one embodiment.

FIG. 1 illustrates an apparatus 100 to be used for acquiring images of ballistic pieces of evidence 102. An object positioning system 120, comprising a memory accessible by a processor and an application coupled to the processor, are provided for use with an optical sensor system for acquiring a surface of an object 102. The surface to be measured is installed at the tip of a rotation motor axis (RMA) of a rotation motor 122. A portion of the surface, called a "patch", is within the field of view (FOV) of the sensor 104. The rotation motor axis (RMA) can be translated along the X and Y direction using a translation motor. In the figure, the sensor 104 can be moved along the vertical (Z) direction using yet another translation motor. However, it should be understood that the basic principles and algorithms are also applicable for a fixed sensor and a rotation motor axis which can be moved along the Z direction. In some embodiments, the object can be maintained at a fixed position and the sensor can be moved in the X, Y, and/or Z directions. The surface area under the FOV is characterized by a normal N which is the average normal of the surface. For an arbitrary surface, the normal N can be significantly different from the direction of the optical axis (OA). While the present description uses RMA, it should be understood that the basic principles and algorithms are also applicable to the Tilt rotation axis (TMA) by suitable interchange of the X and Y coordinates. The expression "rotation axis (MA)" will be used to refer to either the RMA or the TMA.

Figure 2A:
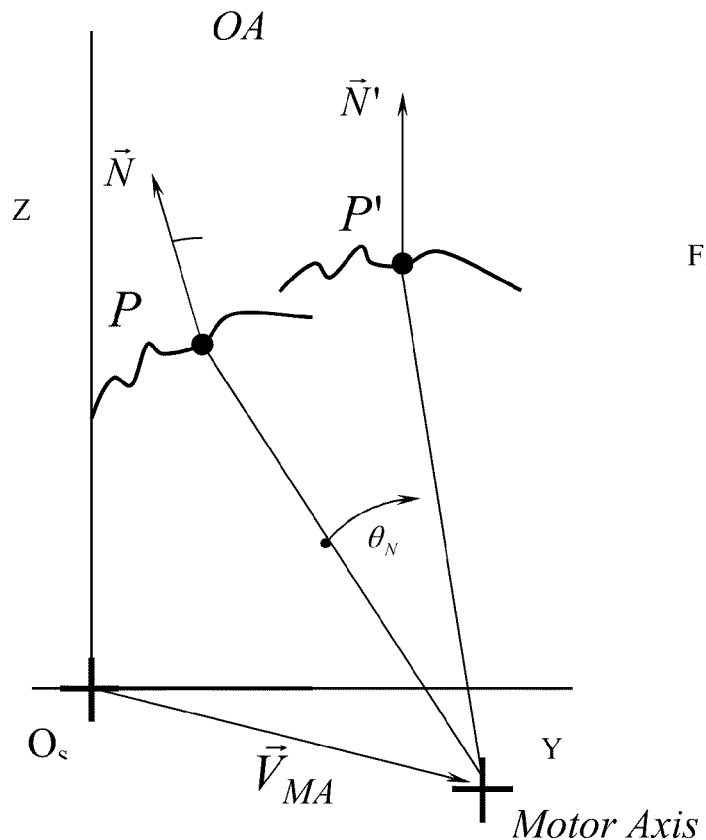
FIG. 2A is a graph showing a topography with a given profile with a center point P and a given axis position having been rotated around the motor axis, thereby resulting in the profile with a center point P', in accordance with one embodiment.
Figure 2B:
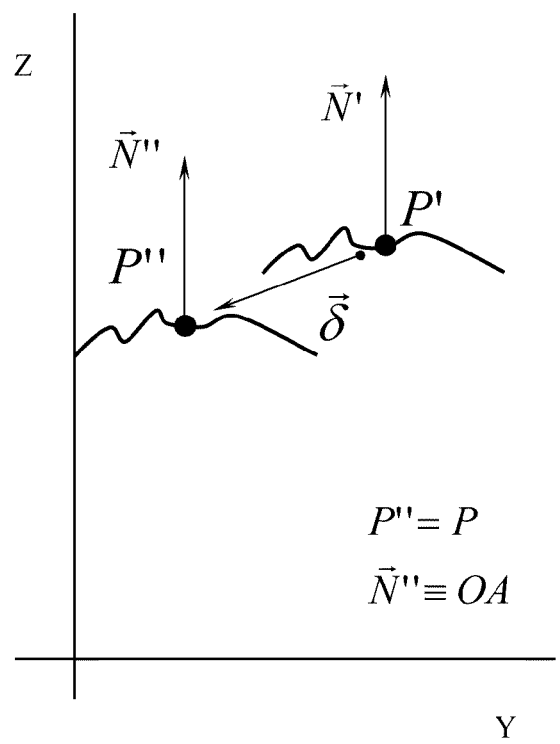
FIG. 2B is a graph showing the rotated topography of FIG. 2A with the translation vector δ needed to bring the area of the topography back to its initial position, in accordance with one embodiment.

FIGS. 2A and 2B illustrate a given 3D topography Z(X,Y), shown in a simplified way as an average profile $Z_{Average}(Y)$ with normal N, as acquired by the system of FIG. 1. In the sensor reference coordinate system, the Y coordinates of the points of the profile cover the range between 0 (the origin) and the length of the profile. If the normal N is not substantially parallel to the optical axis (OA), a rotation $\theta_N$ is applied on the surface in order to bring the direction of the normal along OA, as illustrated by N'. The rotation $\theta_N$ is done with respect to the MA. However, the applied rotation induces a significant displacement of the patch area to be acquired. The center point of the area, which was at P originally, is moved to P' as a result of the rotation. This rotation is illustrated in FIG. 2A. In some cases, the area may leave the field of view. A translation is then performed on the surface in order to compensate for that effect, as shown in FIG. 2B. The purpose of the translation is to bring P' back to P. The initial area is now within the field of view (P"=P) with the right normal N"=N' along the optical axis. $O_s$ is the sensor referential (i.e. reference point of the reference coordinate system) and P is the profile halfway point. $\vec{V}_{MA}$ is the motor axis position vector from $O_s$. As shown in FIG. 2B, the intended motion is a rotation of the profile around point P. However, the only possible physical rotation is around the motor axis MA, shown in FIG. 2A. A translation $\vec{\delta}$ is therefore required since P and MA do not coincide. The vector $\vec{\delta}$ is a function of $\theta_N$ and $\vec{V}_{MA}$.

Figure 3A:
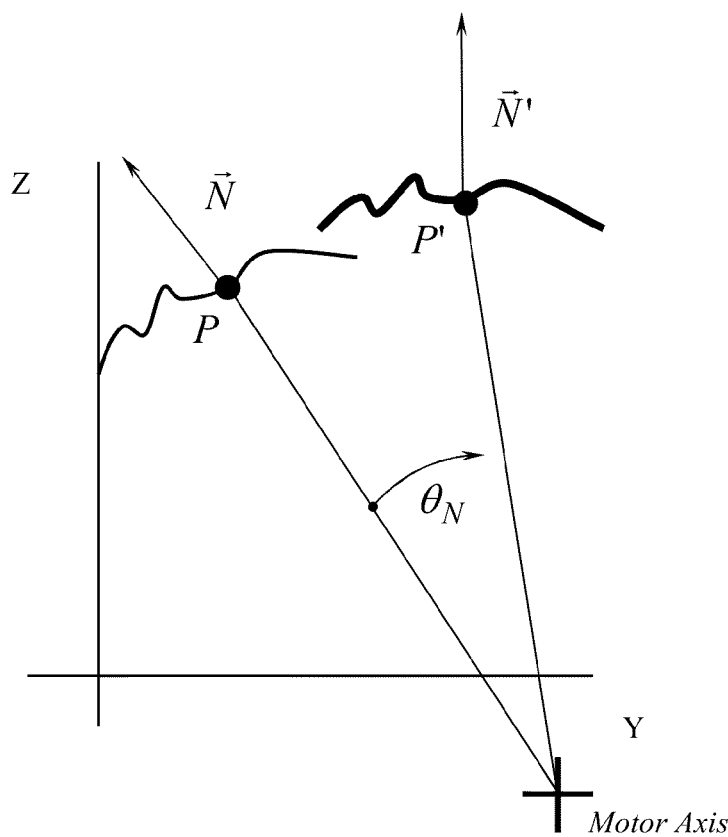
FIG. 3A is a graph showing a topography with a first profile and a first axis position and a final profile with normal N' obtained after rotation $\theta_N$ performed around the first rotation axis, in accordance with one embodiment.
Figure 3B:
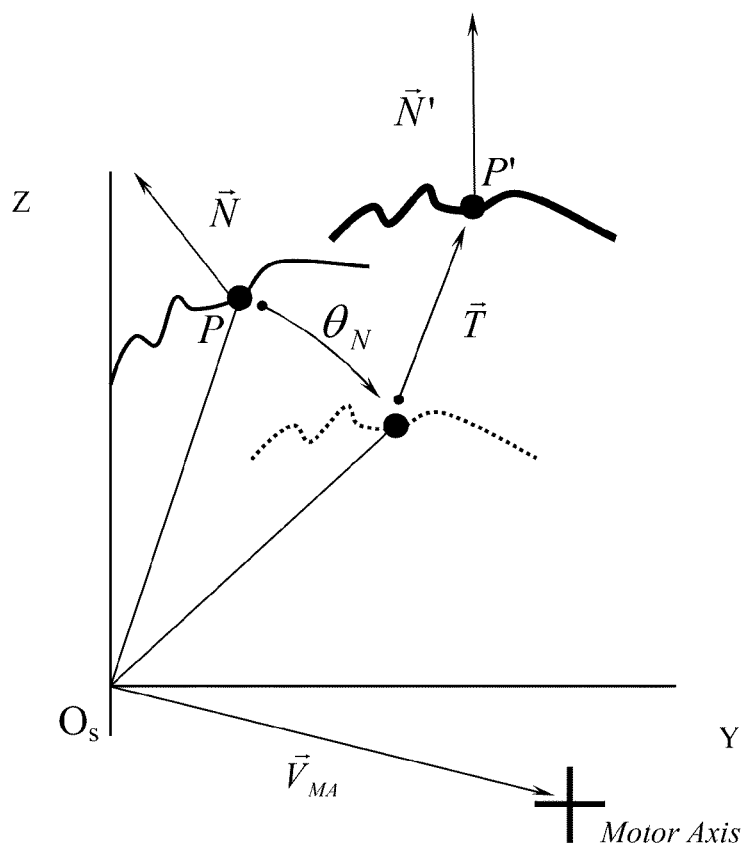
FIG. 3B is a graph showing the same profile as in FIG. 3A but with a different motor axis position, and a comparison between the final profiles obtained after a same rotation $\theta_N$ has been applied, in accordance with one embodiment.

FIGS. 3A and 3B show two scenarios with the same initial profile, but different rotation axes. In the example shown in FIG. 3A, the final profile (shown in bold) results from a rotation around the actual motor axis of the system, while the dotted profile of the example of FIG. 3B is the result of a rotation done numerically around a different axis arbitrarily set at the origin of the sensor coordinate system. The vector T shows the vectorial difference between both final profiles. This illustrates that the position of the profile after a rotation is a function of the rotation axis. We may then conclude that the translation $\vec{\delta}$ that would bring the profile back in the field of view is also a function of the rotation axis.

In order to compute the translation used to return the profile in the field of view of the sensor system, the rotation motor axis can be found with respect to a point fixed in space, which is chosen to be the origin of the sensor coordinate system. This origin point is used as a reference point in the reference coordinate system. Other origins may be chosen as well. The X-Y positions of the origin is defined as the one associated with the image pixel with coordinate (0,0). The Z position of the origin is known from a calibration of the sensor. A procedure then determines the position of the rotation motor axis. Once the rotation motor axis position is known with respect to the first patch, it is updated during the surface acquisition process since translations of the bullets (and hence, of the rotation motor axis) along Y (and possibly Z, if the apparatus is set with a fixed sensor) are involved.

Figure 4:
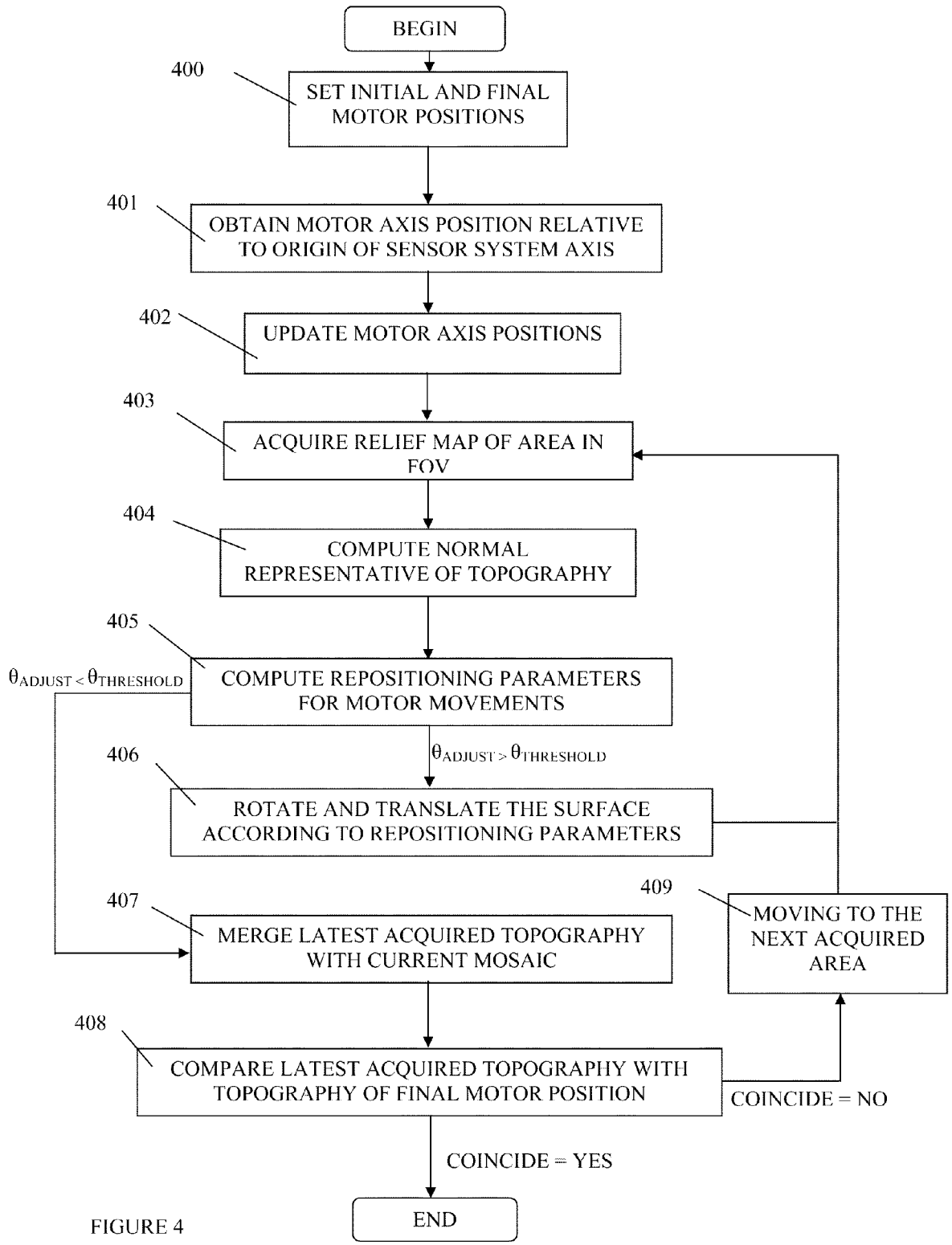
FIG. 4 is a flowchart for a method for positioning an object on an optical sensor system for acquiring a surface thereof, in accordance with one embodiment.

FIG. 4 illustrates a method used for positioning an object on an optical sensor system for acquiring a surface thereof. In one embodiment, it can be used to obtain a band shaped 3D topography of a portion of a surface showing tool marks. The final image, often referred to as a mosaic, is the result of subsequent merging of several topographies having corresponding partially overlapping areas of the surface, each of these topographies being measured while the corresponding surface area is sitting perpendicularly under the optical sensor.

Several steps of the method of FIG. 4 are themselves methods that involve further steps and will be fully described below. In practice, steps 400 and 401 may be inverted. For every rotation and/or translation imposed to the surface while going from step 400 to 401 (or vice versa), the rotation motor axis position, when known, is upgraded accordingly. For example, if one chooses to measure the rotation motor axis position before setting the initial area to be acquired, each surface translation occurring between the measuring of the rotation motor axis position and the initial topography capture of the first patch is updated in the measured rotation motor axis position.

To begin, the initial and final motor positions that delimit the region of the surface to be acquired are set 400. This step is further described in detail below. The rotation motor axis position relative to the origin of the sensor system axis is obtained 401, which is defined by the (0,0) pixel of the data acquired covered by the field of view (FOV) of the sensor and the Z=0 position found from the calibration procedure of the sensor. This step is described in detail further below. The motor axis position is updated 402 such that the rotation motor positions are returned to those corresponding to the initial acquisition patch. Knowing the Y and Z translations $Y_{Trans}$ and $Z_{Trans}$ used to reach this area of the surface, the rotation motor axis positions are then updated as follows:

$R_{Y\text{-updated}} = R_Y + Y_{trans}$;

$R_{Z\text{-Updated}} = R_Z + Z_{Trans}$ (if the rotation motor axis moves along Z and the camera is fixed);

$R_{Z\text{-Updated}} = R_Z$ (if the camera moves along Z but the rotation motor axis does not).

The 3D topography is acquired 403, i.e., a relief map Z(X, Y), of the area currently within the field of view is acquired. This step depends on the particular sensor technology used to acquire the 3D topography. At this point, a 2D luminance image representing the same portion of the surface may be acquired as well. The normal N representative of the topography of the surface captured in Step 403 is computed 404. This step is described in detail further below. The repositioning parameters for motor movements are also computed 405. The following parameters are computed as follows:

$\theta_{ADJUST}$ = angle difference between the normal N and the sensor's optical axis;

$Y_{adjust} = -K_y*(1-N_z) + K_z*N_y$;

$Z_{adjust} = -K_y*(-N_y) + K_z*(1-N_z)$;

Where $K_y = P_y + R_y$; $K_z = P_z + R_z$, and where $P_y$, $P_z$ are the coordinates of the central point of the patch; and $R_y$, $R_z$ are the coordinates of the rotation motor axis position in the sensor system. $R_y$ and $R_z$ are initially obtained from Step 401.

If the absolute value of the adjustment angle ($\theta_{ADJUST}$) is greater than a given small threshold ($\theta_{THRESHOLD}$), the patch is then not perpendicular to the sensor axis. The surface is then rotated and translated 406 according to the adjustment angle and shifts computed during the previous step. The rotation motor axis position is then updated as follows:

$R_{Y\text{-updated}} = R_Y + Y_{Adjust}$;

$R_{Z\text{-updated}} = R_Z + Z_{Adjust}$ (if the rotation motor axis moves along Z and the camera is fixed);

$R_{Z\text{-Updated}} = R_Z$ (if the camera moves along Z but the rotation motor axis does not).

Once the rotation and translation of the surface parameters are completed, the algorithm returns to Step 403. Alternatively, if the absolute value of the adjustment angle ($\theta_{ADJUST}$) is lower than a given small threshold ($\theta_{THRESHOLD}$), the patch is assumed to be nearly perpendicular to the sensor axis. The latest acquired topography is valid and is merged with a current in progress mosaic 407. The merging methods are varied and known to a person skilled in the art. The latest acquired topography is compared with the topography acquired from the final motor set position 408 by use of a similarity measure. If the two topographies are ruled to coincide, then the acquisition is over. Otherwise, the surface is moved to the next area to be acquired 409 to ensure a predetermined overlap value between successive acquired areas. The algorithm returns to step 403 after moving on to the next acquired area.

Different strategies are possible to move the surface to the next area to be acquired 409 to ensure a predetermined overlap value between successive acquired areas. In a first strategy, the surface is rotated by a predetermined fixed value to ensure a predetermined overlap value between successive acquired areas. The direction of rotation (that is, the sign of the rotation angle step) should be consistent with the θ coordinate difference between the initial and final positions that delimit the region to be acquired. This method is optimal for surfaces with a circular cross section (like a cylinder) and whose center of symmetry coincides with the motorized rotation axis.

In a second strategy, the surface is translated by a predetermined fixed value $Shift_y$ to ensure a predetermined overlap value between successive acquired areas. The direction of translation (that is, the sign of $Shift_y$) should be consistent with the Y coordinate difference between the initial and final positions that delimit the region to be acquired. This method is optimal for planar surfaces.

Figure 5:
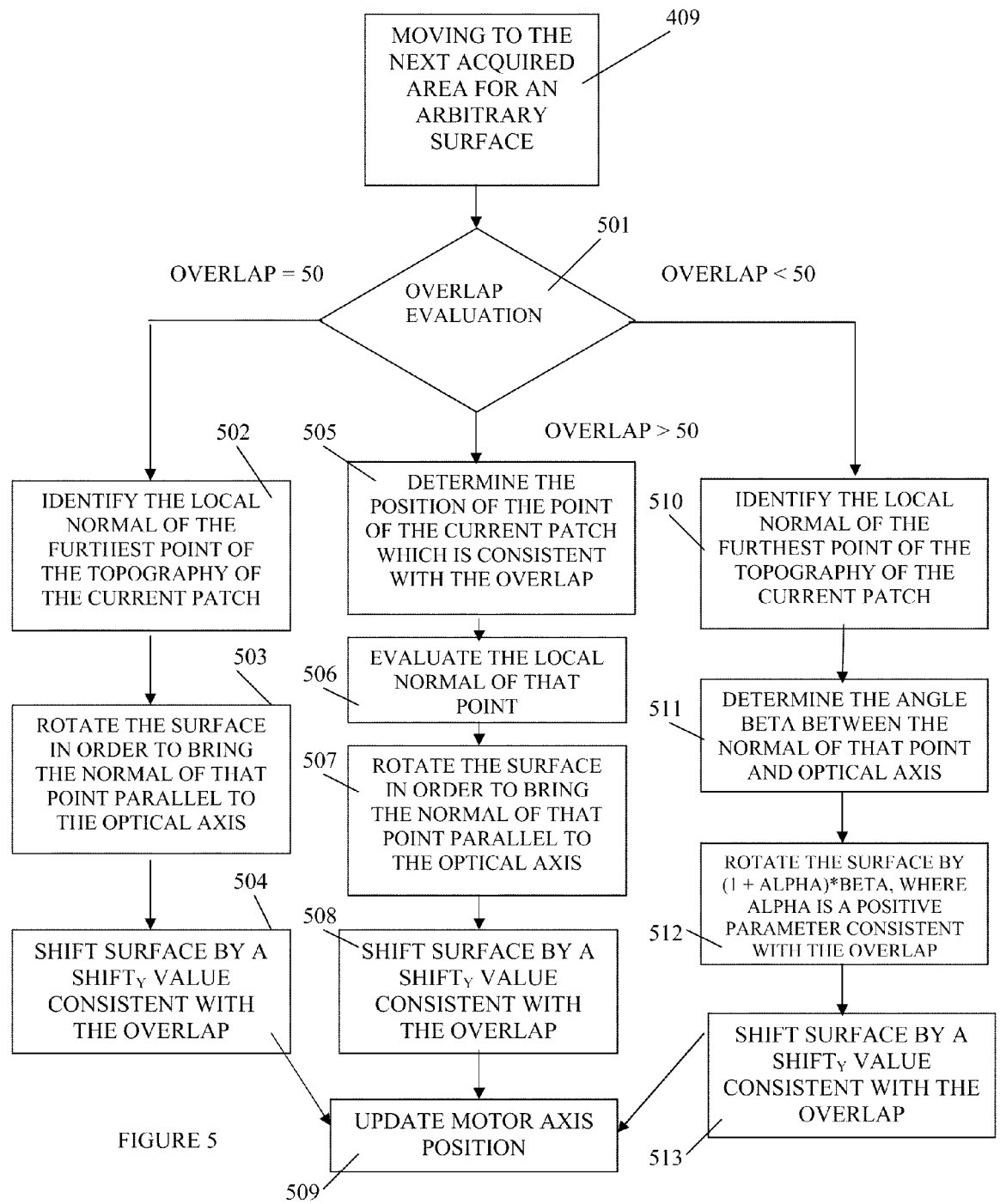
FIG. 5 is a flowchart for a method used to move a surface to the next area to be acquired in accordance with a predetermined overlap value between successive acquired areas, in accordance with one embodiment.
Figure 10A:
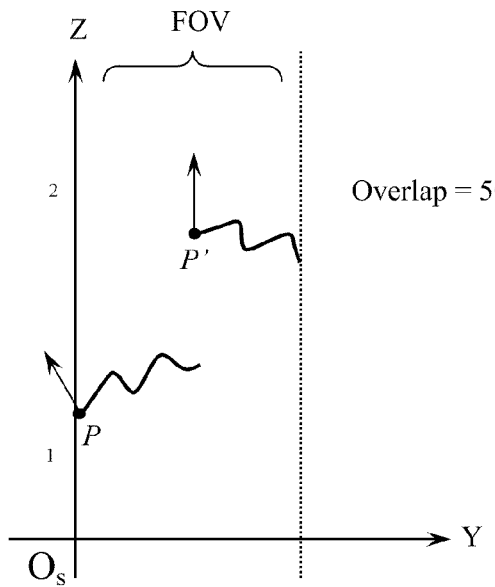
FIGS. 10A, 10B and 10C are graphs showing the profile "1" and the same profile, now indexed "2", after rotation and translation have been applied. The translation is consistent with a fixed predetermined overlap between both profiles (the common area is shown in bold) and the rotation ensures the normal of the center point of profile "2" is along the optical axis. Three scenarios are described, according to whether the overlap is less than, equal to or greater than 50%.

These two strategies are not optimal for arbitrary geometries since they can yield long and tedious iteration loops for steps 403 to 406. Another strategy, for non-circular and non-planar surfaces, and for a predetermined fixed overlap of 50% between successive acquired areas is illustrated in FIGS. 5 and 10A. The local normal of the furthest point of the topography of the current patch (at the boundary of the field of view) along the direction corresponding to the Y and θ coordinate difference between the initial and final positions, point P in FIG. 10A)) is identified 502. The surface is rotated in order to bring the normal of that point parallel to the optical axis 503. The surface is then translated by $Shift_y$ 504 in order to bring that point in the center of the field of view (point P' in FIG. 10A). The rotation motor axis position is updated to $R_{y\text{-}update}=R_y+Shift_y$ 509. FIG. 10A shows the initial profile, with index "1" and the same profile, with index "2", after rotation and translation have been applied. The translation is consistent with a fixed 50% overlap between both profiles (the common area is shown in bold) and the rotation ensures the normal of the center point of profile "2" is along the optical axis. The angle of rotation is the angle difference between the direction of the normal at P and the direction of the optical axis (along Z).

Figure 10B:
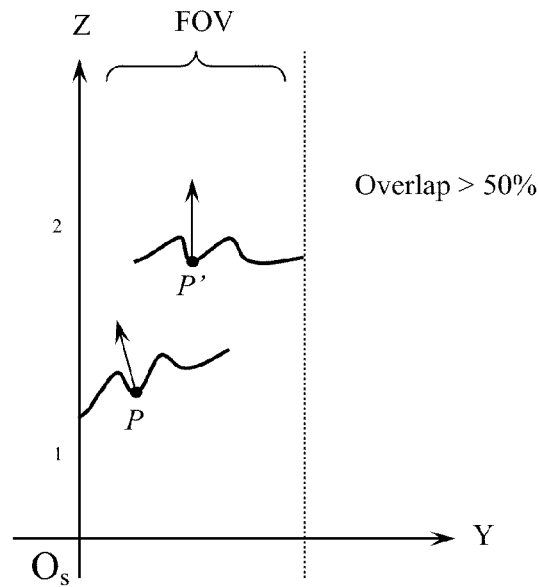

In the case of an overlap evaluation 501 where the desired overlap is >50%, the position of the point of the current patch which is consistent with the predetermined fixed overlap between successive acquired areas (along the direction consistent with the Y and θ coordinate difference between the initial and final positions) is determined 505. This point (P in FIG. 10B) is not at the boundary of the field of view since the overlap is greater than 50%. The position of P is found by linear interpolation between the two following extreme cases: P is at the boundary of the field of view for an overlap of 50% and at the center of the field of view for an overlap of 100%. Therefore, for a general overlap >50%, P is at a distance L*(overlap−50)/100 from the boundary of the field of view, where L is the length of the profile. The local normal at that point is identified 506. The surface is rotated in order to bring the normal of that point parallel to the optical axis 507. The angle of rotation is the angle difference between the direction of the normal at P and the direction of the optical axis (along Z). The surface is translated by $Shift_y$ in order to bring that point in the center of the field of view 508 (point P' in FIG. 10B). The rotation motor axis position is updated to $R_{y\text{-}update}=R_y+Shift_y$ 509.

Figure 10C:
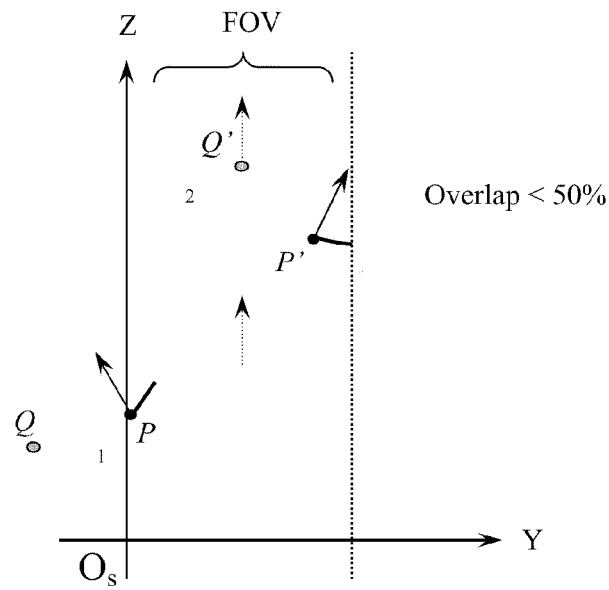

For an overlap <50%, the local normal of the furthest point of the topography of the current patch (at the boundary of the field of view, along the direction corresponding to the Y and θ coordinate difference between the initial and final positions, point P is FIG. 10C) is identified 510. An angle BETA between that normal and the direction of the optical axis is determined 511. The surface is then rotated by (1+ALPHA)*BETA, a multiple of the BETA angle, where the positive parameter ALPHA is described below 512. The surface is translated by $Shift_y$ in order to bring the point P beyond the center of the field of view 513 (at P' in FIG. 10C). The translation corresponds to the expected overlap. The rotation motor axis position is updated 509 to $R_{y\text{-}update}=R_y+Shift_y$.

The angle of rotation is the main unknown when the overlap is <50% since the purpose of the method is to bring a point Q, originally outside the field of view, at the center of the field of view, with its normal along the direction of the optical axis. Since the normal at Q is unknown, it must be approximated by extrapolation, based on the normal at P and the normal at the center of the profile "1", which is vertical by definition. A simple model is to assume a constant local curvature on the profile. This implies that the angle of rotation is (1+ALPHA)*BETA, where ALPHA=(1−OVERLAP/50). This reduces to a rotation by an angle BETA when the overlap is 50% and an angle 2*BETA when the overlap is near 0%. However, some other model of extrapolation could be used, as long as ALPHA approaches 0 when the overlap approaches 50%.

This method is optimal for predetermined overlap values of greater or equal to 50% because the part of the topography brought under the camera is already known and is used to compute the translation and rotation movements necessary to put it in place. The loop of steps 403 to 406 will then be minimized. For predetermined values of overlap less than 50%, most of the topography of the area that is brought under the camera is not known beforehand. It is then likely that a few iteration loops through steps 403 to 406 will be necessary.

As described above with respect to step 400, one of the steps is to set the initial position of a portion of the surface in the FOV of the sensor. This is used whenever a user places a portion of the surface into the FOV of the sensor. It ensures that the surface in the sensor's FOV is perpendicular to the optical axis. In the overall process of the method described above, this may be done multiple times. For example: to set the position of the initial and final areas of the surface that delimit the extent of the surface to be acquired, and to set the position of the area of the surface to be used to determine the position of the rotation motor axis in the referential of the sensor. It may also be done only once in the case of a wrap around surface (such as the surface of a bullet, deformed or not) where initial and final acquisition patches coincide and when this patch is further used to measure the rotation motor axis position.

Figure 6:
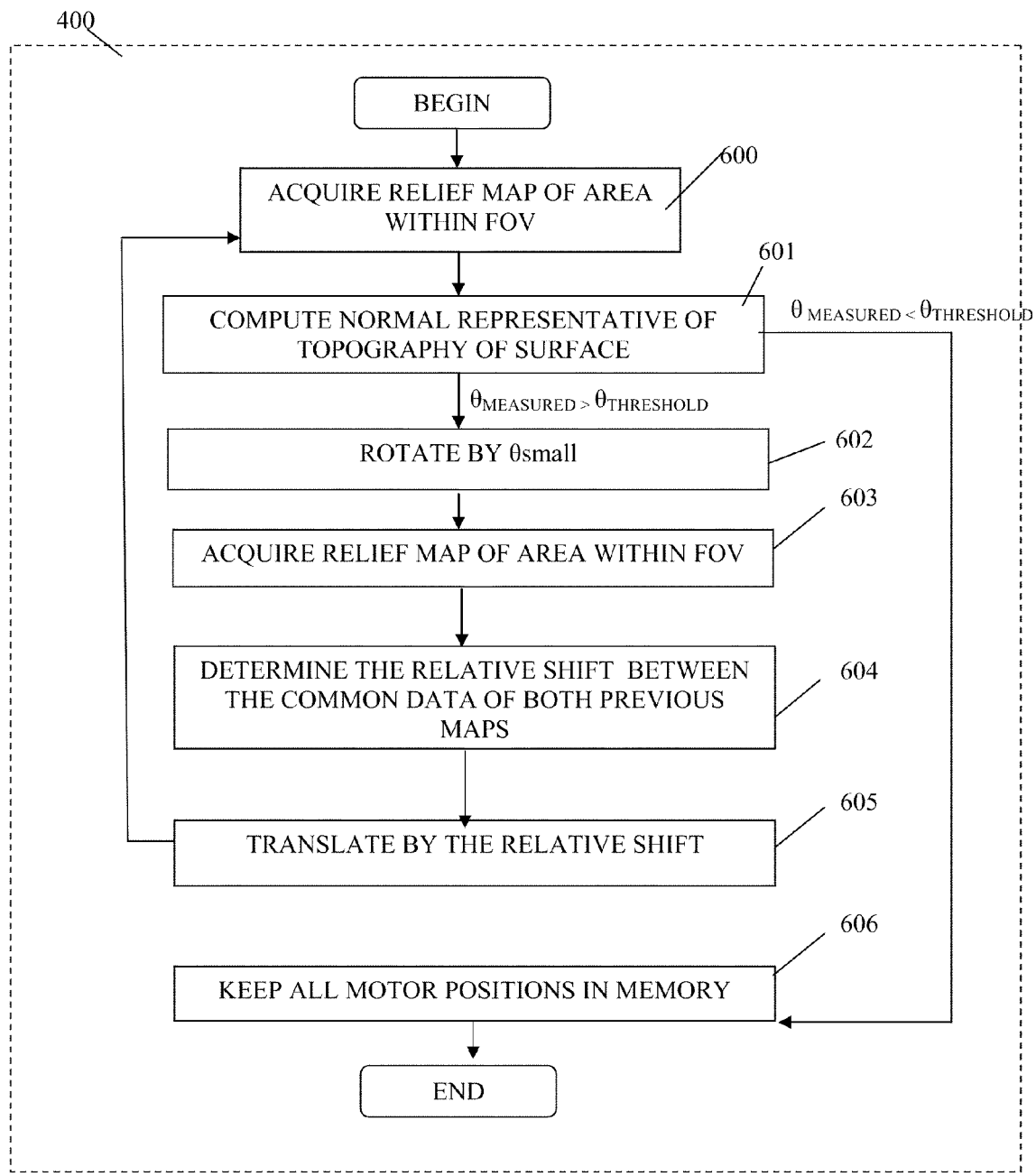
FIG. 6 is a flowchart illustrating a method used to set the initial position of a portion of the surface in the field of view of the sensor, in accordance with one embodiment.
Figure 9:
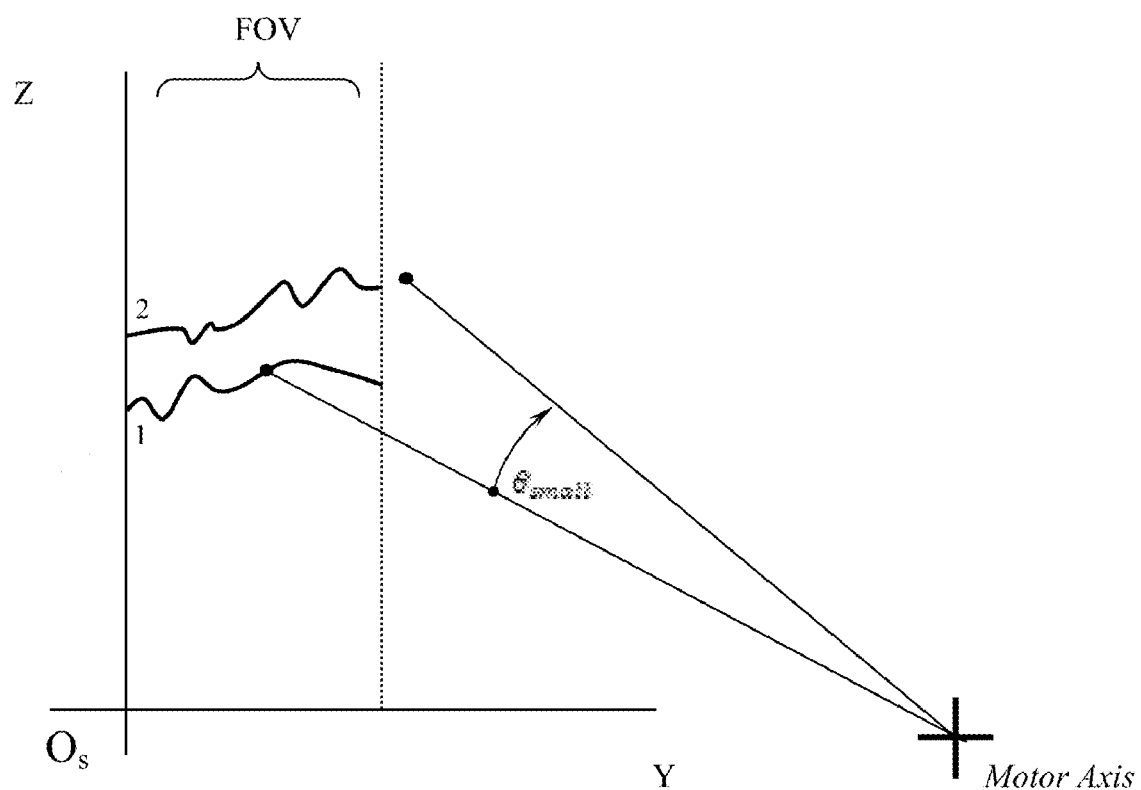
FIG. 9 is a graph illustrating two profiles successively acquired on a surface of an object, in accordance with an embodiment.

FIG. 6 illustrates an embodiment of this method. The 3D topography, i.e, a relief map Z(X,Y) of the area currently within the field of view, is acquired 600. This step depends on the particular sensor technology used to acquire the 3D topography. At this point, a 2D luminance image representing the same portion of the surface may be acquired as well. The normal N representative of the topography of the surface captured in Step 600 is computed 601. This step is described in detail further below. The angle $\theta_{MEASURED}$ between the normal N and the optical axis is computed. If the absolute value of the measured angle ($\theta_{MEASURED}$) is lower than a given small threshold ($\theta_{THRESHOLD}$), the patch is perpendicular to the sensor optical axis and all motor positions are kept in memory 606. If the absolute value of the measured angle ($\theta_{MEASURED}$) is greater than the small threshold ($\theta_{THRESHOLD}$), the patch is then not perpendicular to the sensor axis and the object is rotated by a small angle in a direction (i.e., its sign) that corresponds to the measured angle 602. FIG. 9 illustrates the rotation by $\theta_{SMALL}$.

A second 3D topography, that is, a relief map Z(X,Y) of the area currently within the field of view, is acquired 603. This step depends on the particular sensor's technology used to acquire 3D topography. At this point, a 2D luminance image representing the same portion of the surface may be acquired as well. The relative shift in Y between the pair of images acquired in steps 600 and 603 are determined 604. The pair of topographic images and/or the 2D luminance images can be used (it is not necessary to use the topographic image since the relative shift in Z is of no interest). As a result of the small rotation performed in Step 602, both images have a significant common area. Any type of image similarity measuring algorithm can be used to determine the relative shift in Y. Such an algorithm defines a similarity value over a set of shift values. The relative shift between both images is defined as the one associated with the optimal similarity value. The surface is then translated 605 by the relative shift found in 604. At this point, the area within the field of view is the same as in step 600. However, the orientation of the topography has changed as a result of the rotation applied in 602. A relief map of the area within the FOV is again acquired 600 the normal is again calculated 601 to compare $\theta_{MEASURED}$ with $\theta_{THRESHOLD}$. If the absolute value of the $\theta_{MEASURED}$ is lower than $\theta_{THRESHOLD}$, the patch is perpendicular to the sensor optical axis and all motor positions are kept in memory 606.

In many cases where a visual feedback, via the display of the system, is given to the user, the user can visually figure out the rotation and eventually translation needed to improve perpendicularity. Automated searching processes can also be used to provide guesses of rotation and translation towards perpendicularity.

Figure 7:
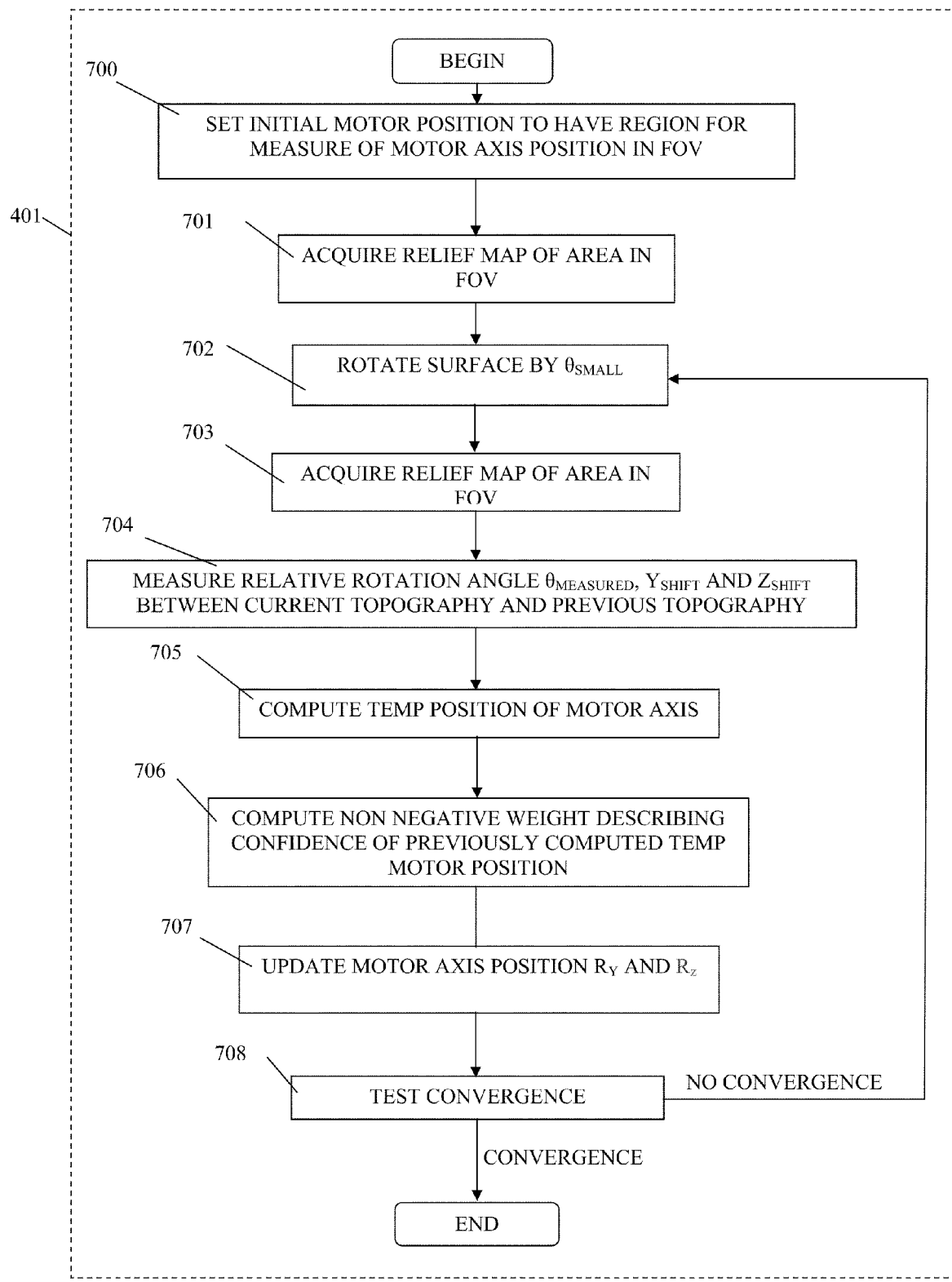
FIG. 7 is a flowchart illustrating a method used to find the rotation motor axis position with respect to a reference point in a reference coordinate system, in accordance with one embodiment.

As described in step 401 above, one step is to find the rotation motor axis position with respect to the origin of the sensor coordinate system. In accordance with one embodiment, there is described below one way of performing this step, illustrated in the flow chart of FIG. 7. The initial motor set positions are set in a manner that the region of the surface to be used for the measure of the rotation motor axis position lies in the FOV of the sensor 700. The area to be used to measure the rotation motor axis position is chosen in a manner that a small rotation of the surface is not prone to induce collision between the object and the sensor. The step of setting a set of motor positions over a particular region of the surface is described in detail above.

The 3D topography is acquired 701, that is, a relief map Z(X,Y) of the area currently within the field of view is acquired. This step depends on the particular sensor technology used to acquire 3D topography. At this point, a 2D luminance image representing the same portion of the surface may be acquired as well. The surface is rotated by a predefined small angle $\theta_{Small}$ 702. This angle is defined in order to minimize the risk of collision and ensure a good overlap between successive patches. Typical values are between 1 and 6 degrees. The 3D topography is acquired 703, that is, a relief map Z(X,Y), of the area currently within the field of view. This step depends on the particular sensor technology used to acquire 3D topography. At this point, a 2D luminance image representing the same portion of the surface may be acquired as well. The relative rotation angle ($\theta_{Measured}$), Y and Z shifts between the current topography and previously measured topography are measured 704. This may be done by computing a similarity measure between the common area of both topographies over a set of angle rotations, Y and Z relative translations of both topographies. The optimal rotation angle, Y and Z shifts are defined as the ones associated with the highest computed similarity measure.

A temporary position of the rotation motor axis, consistent with the current and previous patch only, is computed from the relative angle, Y and Z shifts ($\Delta Y$ and $\Delta Z$) 705, previously computed in step 704, with the formula:

$$R_{Y\_TEMP} = \frac{1}{2}*[-\Delta Y - \Delta Z*(\sin \Delta\theta)/(1-\cos \Delta\theta)];$$

$$R_{Z\_TEMP} = \frac{1}{2}*[-\Delta Z + \Delta Y*(\sin \Delta\theta)/(1-\cos \Delta\theta)].$$

A non-negative weight which describes the confidence in the previously computed temporary rotation motor position is computed 706. This confidence is an increasing function of the roughness and similarity of the two compared profiles. The rotation motor axis position $R_Y$ and $R_Z$ is computed 707 as a weighted average of all temporary positions $R_{TEMP}$, using quality weights found at the current and previous iterations.

$$R_Y = \frac{\sum_i (R_{Y\_TEMP\_i} * weight_i)}{\sum_i (weight_i)};$$

$$R_Z = \frac{\sum_i (R_{Z\_TEMP\_i} * weight_i)}{\sum_i (weight_i)}.$$

The values of $R_Y$ and $R_Z$ are stored at each iteration. Convergence of the procedure is tested using the last N computed values for the rotation motor axis position 708. One possible procedure for testing convergence is to determine if the variance of the last N values of $R_Y$ and $R_Z$ are less than a predetermined threshold, where N is a hard coded integer greater than 1. This test can be performed if there are at least N values of $R_Y$ and $R_Z$ available. Otherwise, the solution has still not converged. If the solution has not converged, go back to step 702, otherwise the procedure ends. The initial position of (Ry, Rz) is assumed to be (0,0) for the first iteration. Other ways of testing for convergence known to a person skilled in the art may also be applied.

Figure 8:
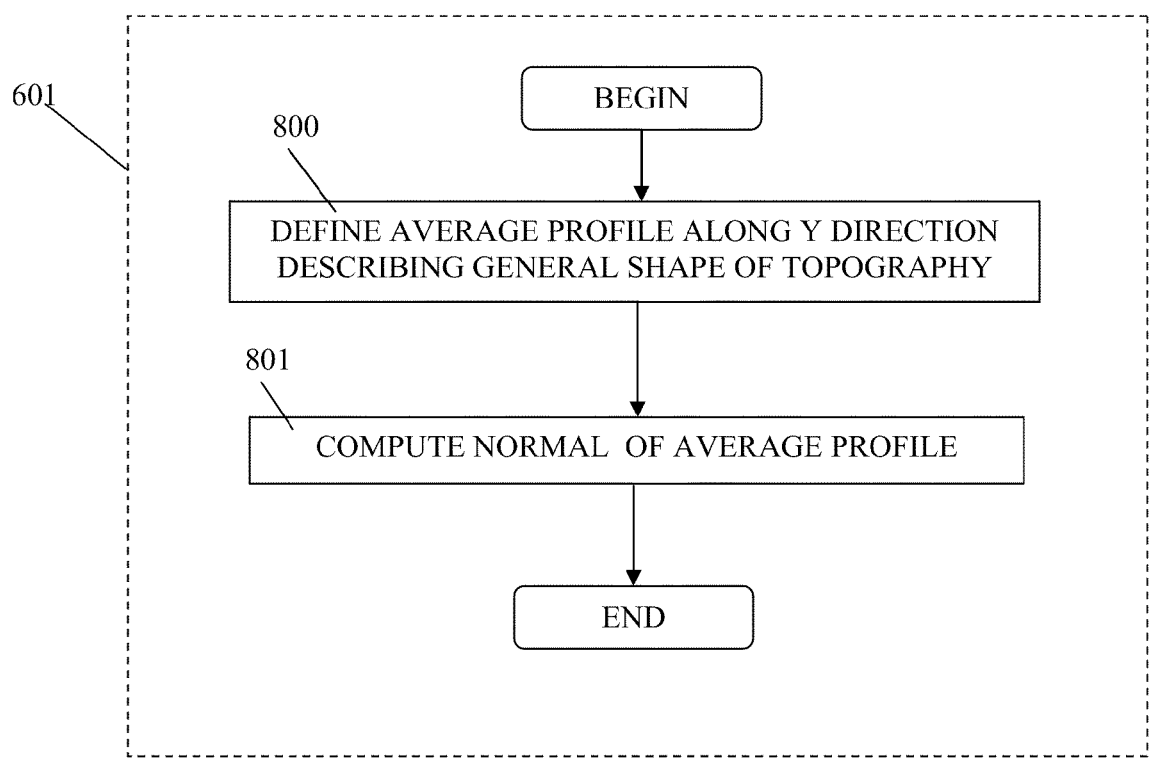
FIG. 8 is a flowchart illustrating a method used to compute the normal of a portion of a surface, in accordance with one embodiment.

FIG. 8 illustrates in more detail step 601 of FIG. 6, which is a method used to compute the average normal of a portion of a surface. It is assumed that a measured topography representative of the portion of the surface is given as an input to the method. An average profile $Z_{AVERAGE}(Y)$ is defined along the Y direction that describes the general shape of the topography 800. The mean profile can be the mean (weighted or not) or the median of the profiles $Z_{AVERAGE}(Y)$=Mean over X of Z(X,Y), or Median over X of Z(X,Y). The exact mathematical computations of the average profile may change as a function of the type of surface given in input. The normal N of the average profile is computed 801. The normal is found by averaging the local normal of the profile on each point:

$$N=(N_y,N_z)=\text{Mean over } i(N\_i)$$

where the local normal may be found by finite differencing with a neighbor.

$$N_i=([z(i)-z(i+1)],-([y(i)-y(i+1)]) \text{ or by other techniques based on one or more neighbors.}$$

While the blocks of the methods in FIGS. 4 to 8 are shown as occurring in a particular order, it will be appreciated by those skilled in the art that many of the blocks are interchangeable and may occur in different orders than that shown without materially affecting the end results of the methods. Additionally, while the present disclosure relates to code or functions that reside on a processor, this is not meant to limit the scope of possible applications of the described methods. Any system that a processor could be utilized without causing departure from the spirit and scope of the present disclosure.

While the present disclosure is primarily described as a method, a person of ordinary skill in the art will understand that the present disclosure is also directed to an apparatus for carrying out the disclosed method and including apparatus parts for performing each described method block, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular example embodiments without departing from the intended scope of the present disclosure. In particular, selected features from one or more of the above-described example embodiments may be combined to create alternative example embodiments not explicitly described, features suitable for such combinations being readily apparent to persons skilled in the art. The subject matter described herein in the recited claims intends to cover and embrace all suitable changes in technology.

We claim:

1. A method for positioning an object on an optical sensor system for acquiring a surface thereof, the optical sensor system having a set of motors for rotating the object around a motor axis perpendicular to an optical axis of the optical sensor system and for translating the object in X, Y and Z directions, the method comprising:
    (a) determining a motor axis position relative to a reference position in a reference coordinate system;
    (b) positioning at least one of said optical sensor system and said object to correspond to a desired position for an acquisition and acquiring a relief map of an area in a field of view of the optical sensor system;
    (c) computing a normal representative of a topography of the relief map of the area;
    (d) determining an angle difference between the normal and the optical axis of the optical sensor system and comparing the angle difference to a threshold angle to determine if a surface of the area is perpendicular to the optical axis of the sensor system; and
    (e) if the angle difference is greater than a threshold angle, dynamically computing a set of repositioning parameters using the motor axis position, for rotating the object to obtain a new difference angle less than said threshold angle and translating said object to reposition said area in said field of view after said rotating has displaced said area.

2. The method of claim 1, further comprising repeating steps (b) through (f) for said relief map of said area until said new difference angle is less than said threshold angle after said translating.

3. The method of claim 1, wherein said determining an actual position of said motor axis comprises:
    (g) assuming an actual position of (0,0) for said motor axis;
    (h) acquiring a first relief map of an area in a field of view of the optical sensor system with said set of motors at said initial position;
    (i) performing a rotation of said surface of the object about said motor axis by a given angle θ;
    (j) acquiring a subsequent relief map of an area in the field of view of the optical sensor system;
    (k) measuring a relative rotation and shift between the first relief map and the subsequent relief map;
    (l) computing a temporary motor axis position using only the first relief map and the subsequent relief map;
    (m) computing a confidence weight describing a confidence with the temporary motor axis position;
    (n) updating the actual position of the motor axis using the confidence weight and the temporary motor axis position;
    (o) testing for convergence of an updated actual position; and
    (p) repeating steps (i) to (o) until convergence is achieved.

4. The method of claim 1, further comprising:
    setting said set of motors to an initial position for an initial acquisition of said surface of the object and a final position for a final acquisition of said surface of the object to determine the motor axis position.

5. The method of claim 1, further comprising:
    moving at least one of said object and said optical sensor system to provide a new surface area in said field of view of said optical sensor system; and
    repeating steps (b) through (e) for multiple areas of said surface of the object and merging said multiple areas to create a mosaic of said surface of said object.

6. The method of claim 4, wherein said setting said set of motors to an initial position comprises:
    (q) acquiring a first relief map of the area in a field of view of the optical sensor system;
    (r) computing an initial normal representative of a topography of the relief map of the area;
    (s) measuring an initial angle between the initial normal and the optical axis and comparing with the threshold angle;
    (t) if the measured initial angle is greater than the threshold angle, rotating the object by a given value to obtain a new angle;
    (u) acquiring a second relief map of an area within the field of view after the rotating of step (t);
    (v) determining a relative shift between common data from the first relief map and the second relief map;
    (w) translating the object by the relative shift and repeating steps (q) through (w) until the measured initial angle is less than said threshold angle; and
    (x) if the measured initial angle is less than said threshold angle, storing a current position of said set of motors as said initial position.

7. The method of claim 5, wherein said moving at least one of said object and a sensor to provide a new surface area in said field of view comprises having an dynamically determined overlap between successive areas that is greater than 50%.

8. The method of claim 5, wherein said moving at least one of said object and a sensor to provide a new surface area in said field of view comprises having an dynamically determined overlap between successive areas that is less than 50%.

9. The method of claim 5, wherein said moving at least one of said object and a sensor to provide a new surface area in said field of view comprises having dynamically determined overlap between successive areas that is about 50%.

10. The method of claim 6, wherein said (r) computing an initial normal representative of a topography of the relief map of the area comprises:
    defining an average profile along a Y direction describing an approximate shape of the topography; and
    computing the normal of the average profile.

11. The method of claim 7, wherein said moving comprises:
    determining a position of a point of a current patch which is consistent with the overlap between successive acquired areas;
    identifying a normal at that point;
    rotating the object in order to bring the normal of that point parallel to the optical axis;
    translating the surface by a y-shifting parameter $Shift_y$ in order to bring that point in a center of the field of view; and updating the motor axis position to an updated y-position $R_{y\text{-}update}=R_y+\text{Shift}_y$, wherein $R_y$ is an original y-position.

12. The method of claim 8, wherein said moving comprises:
    identifying a normal of a furthest point of a topography of a current patch at a boundary of the field of view;
    determining an angle BETA between the normal of the furthest point and the optical axis;
    rotating the object by (1+ALPHA)*BETA, where ALPHA is a positive parameter that is a decreasing function of the overlap which approaches zero when the overlap approaches 50%;
    translating the object by a y-shifting parameter $\text{Shift}_y$ in order to bring the furthest point beyond a center of the field of view in accordance with the overlap; and
    updating the motor axis position to an updated y-position $R_{Y\text{-}update}=R_Y+\text{Shift}_Y$, wherein $R_y$ is an original y-position.

13. The method of claim 9, wherein said moving comprises:
    identifying a normal of a furthest point of a topography of a current patch at a boundary of the field of view;
    rotating the object in order to bring the normal of the furthest point parallel to the optical axis;
    translating the surface in order to bring the furthest point in a center of the field of view; and
    updating the motor axis position to an updated y-position $R_{Y\text{-}update}=R_Y+\text{Shift}_y$, wherein $R_y$ is an original v position and $\text{Shift}_y$ is a y-shifting parameter.

14. An object positioning system for use with an optical sensor system for acquiring a surface of the object, the optical sensor system having a set of motors for rotating the object around a motor axis perpendicular to an optical axis of the optical sensor system and for translating the object in X, Y and Z directions, the object positioning system comprising:
    a processor in a computer system;
    a memory accessible by the processor; and
    an application coupled to the processor, wherein the application, when executed by the processor:
    (a) determine a motor axis position relative to a reference position in a reference coordinate system;
    (b) positions at least one of said optical sensor system and said object to correspond to a desired position for an acquisition and acquiring a relief map of an area in a field of view of the optical sensor system;
    (c) computes a normal representative of a topography of the relief map of the area;
    (d) determines an angle difference between the normal and the optical axis of the optical sensor system and comparing the angle difference to a threshold angle to determine if a surface of the area is perpendicular to the optical axis of the optical sensor system;
    (e) if the angle difference is greater than a threshold angle, dynamically computes a set of repositioning parameters using the motor axis position, for rotating the object to obtain a new difference angle less than said threshold angle and translating said object to reposition said area in said field of view after said rotating has displaced said area.

15. The system of claim 14, wherein said actual position of said motor axis is determined by:
    (g) assuming an actual position of (0, 0) for said motor axis;
    (h) acquiring a first relief map of an area in a field of view of the optical sensor system with said set of motors at said initial position;
    (i) performing a rotation of said surface of the object about said motor axis by a given angle θ;
    (j) acquiring a subsequent relief map of an area in the field of view of the optical sensor system;
    (k) measuring a relative rotation and shift between the first relief map and the subsequent relief map;
    (l) computing a temporary motor axis position using only the first relief map and the subsequent relief map;
    (m) computing a confidence weight describing a confidence with the temporary motor axis position;
    (n) updating the actual position of the motor axis position using the confidence weight and the temporary motor axis position;
    (o) testing for convergence of said actual position as updated; and
    (p) repeating steps (i) to (o) until convergence is achieved.

16. The system of claim 14, wherein said application is also:
    sets said set of motors to an initial position for an initial acquisition of said surface of the object and a final position for a final acquisition of said surface of the object for determining the actual position of the motor axis.

17. The system of claim 14, wherein said application further:
    moves at least one of said object and a sensor to provide a new surface area in said field of view of said optical sensor system; and
    repeats steps (b) through (e) for multiple areas of said new surface area and merging said multiple areas to create a mosaic of said surface of said object.

18. The system of claim 16, wherein said set of motors are set to an initial position by:
    (q) acquiring a first relief map of an area in a field of view of the optical sensor system;
    (r) computing a normal representative of a topography of the first relief map of the area;
    (s) measuring an angle between the normal of step (r) and the optical axis and comparing with the threshold angle;
    (t) if the measured angle is greater than the threshold angle, rotating the object by a given value to obtain a new angle;
    (u) acquiring a second relief map of an area within the field of view after the rotating of step (t);
    (v) determining a relative shift between common data from the first relief map and the second relief map;
    (w) translating the object by the relative shift and repeating steps (q) through (w) until the measured angle is less than said threshold angle; and
    (x) if the measured angle is less than said threshold angle, storing a current position of said set of motors as said initial position.

19. The system of claim 18, wherein said (r) computing a normal representative of a topography of the relief map of the area comprises:
    defining an average profile along a Y direction describing an approximate shape of the topography; and
    computing the normal of step (r) of the average profile.

20. The system of claim 17, wherein said application moves said at least one of said object and a sensor to provide a new surface area in said field of view by providing an overlap between successive areas that is greater than 50%.

21. The system of claim 17, wherein said application moves said at least one of said object and a sensor to provide a new surface area in said field of view by providing an overlap between successive areas that is less than 50%.

22. The system of claim 17, wherein said application moves said at least one of said object and a sensor to provide a new surface area in said field of view by providing an overlap between successive areas that is about 50%.

23. The system of claim 20, wherein said application moves at least one object and a sensor to a new surface area by:
   determining a position of a point of a current patch which is consistent with a predetermined fixed overlap between successive acquired areas;
   identifying a normal at that point;
   rotating the object in order to bring the normal of that point parallel to the optical axis;
   translating the surface of the object by a y-shifting parameter $Shift_y$ in order to bring that point in a center of the field of view; and
   updating the motor axis position to an updated y-position $R_{y\text{-}update}=R_y+Shift_y$, wherein $R_y$ is an original y-position.

24. The system of claim 21, wherein said application moves said at least one object and a sensor to a new surface area by:
   identifying a normal of a furthest point of a topography of a current patch at a boundary of the field of view;
   determining an angle BETA between the normal of the furthest point and the optical axis;
   rotating the object by (1+ALPHA)*BETA, where ALPHA is a positive parameter that is a decreasing function of the overlap which approaches zero when the overlap approaches 50%;
   translating the object by a y-shifting parameter $Shift_y$ in order to bring the point beyond a center of the field of view in accordance with the overlap; and
   updating the motor axis position to an updated y-position $R_{Y\text{-}update}=R_Y+Shift_Y$, wherein $R_y$ is an original y-position.

25. The system of claim 22, wherein said application moves said at least one object and a sensor to a new surface area by:
   identifying a normal of a furthest point of a topography of a current patch at a boundary of the field of view;
   rotating the object in order to bring the normal of the furthest point parallel to the optical axis;
   translating the surface of the object in order to bring the furthest point in a center of the field of view; and
   updating the motor axis position to an updated y-position parameter $R_{Y\text{-}update}=R_Y+Shift_y$, wherein Ry is an original position and $Shift_y$ is a y-shifting parameter.

* * * * *